Figure 1:
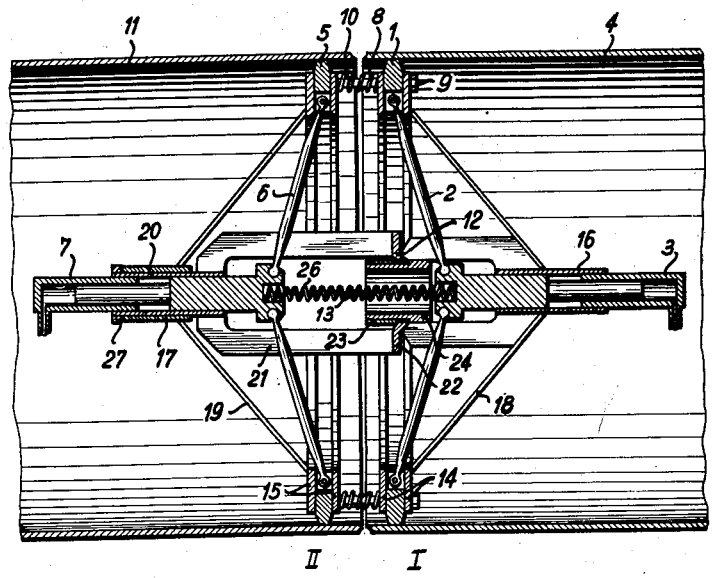

Dec. 31, 1963   F. HÄUSSLER ETAL   3,115,859
CENTERING DEVICE FOR WELDING ENDS OF PIPE

Filed Sept. 22, 1959   4 Sheets-Sheet 1

INVENTORS:
FRIEDRICH HÄUSSLER
HANS GÜNTHER, AUGUST THOMAS
by
Mestern & Kollin
ATTORNEYS Dec. 31, 1963   F. HÄUSSLER ETAL   3,115,859
CENTERING DEVICE FOR WELDING ENDS OF PIPE
Filed Sept. 22, 1959                    4 Sheets-Sheet 2

INVENTORS:
FRIEDRICH HÄUSSLER,
HANS GÜNTHER, AUGUST THOMAS
by
Mestern & Kollin
ATTORNEYS INVENTORS:
FRIEDRICH HÄUSSLER,
HANS GÜNTHER, AUGUST THOMAS
by
Mestern & Rollin.
ATTORNEYS Dec. 31, 1963    F. HÄUSSLER ETAL    3,115,859
CENTERING DEVICE FOR WELDING ENDS OF PIPE
Filed Sept. 22, 1959    4 Sheets-Sheet 4
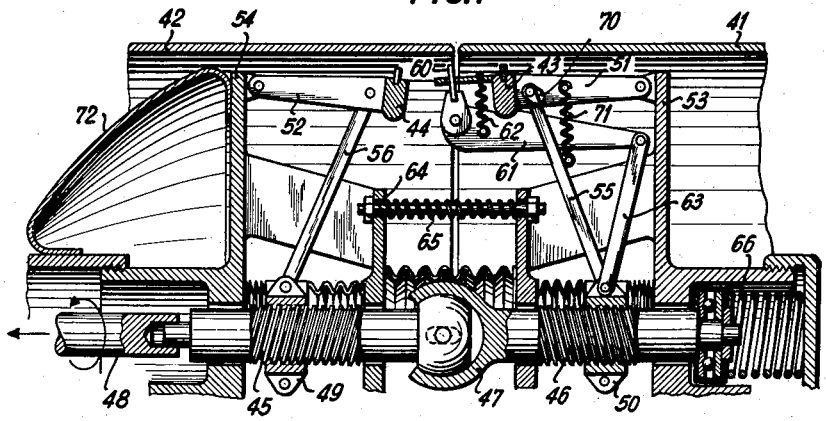
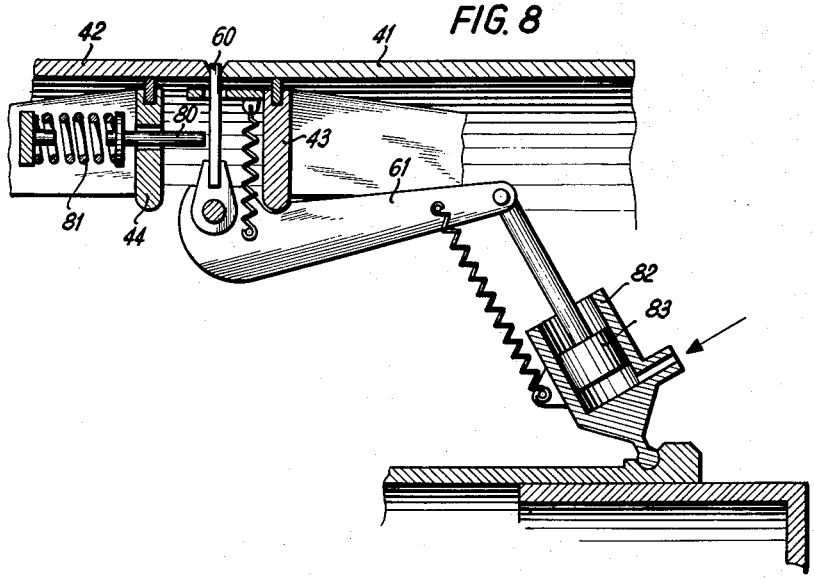
INVENTORS:
FRIEDRICH HÄUSSLER,
HANS GÜNTHER, AUGUST THOMAS
by
Mestern & Kollin
ATTORNEYS

United States Patent Office 3,115,859
Patented Dec. 31, 1963

3,115,859
CENTERING DEVICE FOR WELDING
ENDS OF PIPE
Friedrich Häussler, Heidelberg-Pfaffengrund, and Hans Günther and August Thomas, Heidelberg, Germany, assignors to Kraftanlagen AG., Heidelberg, Germany
Filed Sept. 22, 1959, Ser. No. 841,524
Claims priority, application Germany Sept. 24, 1958
10 Claims. (Cl. 113—102)

The invention relates to the welded assembly of lengths of pipe and tubing, and specifically to a centering device. The function of such centering devices is to center the ends of pipe before and during the inside weld. Also, they facilitate accurate straightening of the pipes, adjustment of the proper gap around the entire seam, and proper maintenance of that position during welding. In addition, such devices should be designed to shorten set-up time as much as possible, since the progress of operations depends to a large extent on set-up time.

The centering device according to the invention meets these requirements. In otherwise known manner, it is provided with two clamping systems, one to engage each of the two facing ends of pipe, and pivotable relative to each other. In contradistinction to known devices of this kind, evidently intended originally for other purposes and quite unsuitable for laying long pipelines, for example in trenches, the essential feature of the centering device according to the invention consists in that the clamping systems engage the lengths of pipe from within, and in that the pivot is about on the centerline of the pipe. As a rule, it will be advantageous to locate the pivot approximately in the plane of the weld. An important feature in further accordance with the invention consists in that the two clamping systems, in otherwise known manner, are displaceable relative to each other in axial direction as well.

This centering device according to the invention simplifies pipe alignment and adjustment of proper seam gap, permits great accuracy to be achieved even under adverse conditions, and has therefore been elaborated especially for electric arc welding, where such accuracy is of great importance both to the quality of the weld obtainable and to the speed of operation. The centering device according to the invention is likewise serviceable for conventional welding by hand as well as for automatic welding with devices for electromagnetic control of the arc, and also for welding with several arcs simultaneously, distributed, say, symmetrically over the perimeter.

There are, then, three features of major significance to the centering device according to the invention in combination with each other: (1) The clamping systems engage the pipe ends from within; (2) the clamping systems are pivotable at a point (not merely on an axis), and hence in any direction relative to each other; (3) the pivot lies approximately on the pipe centerline.

The device according to the invention will now be more fully described with reference to the accompanying drawings, but it should be understood that these are given by way of illustration and not of limitation and that many changes in the details may be made without departing from the spirit of the invention.

Figure 2:
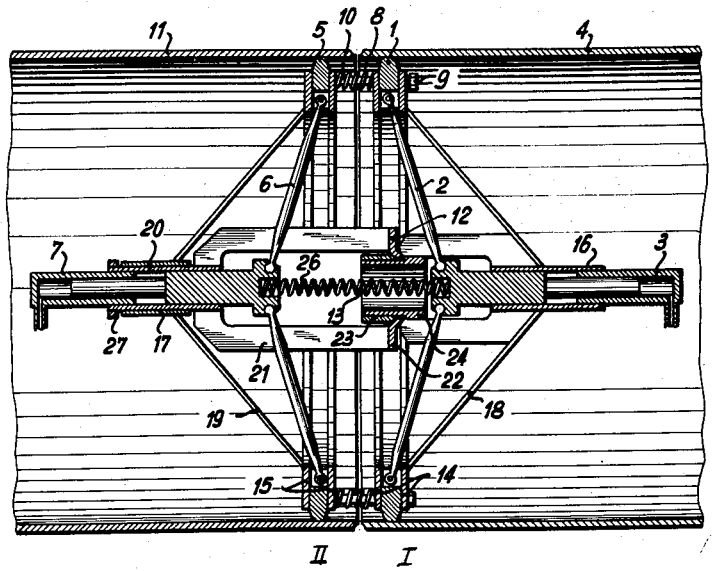
Figure 3:
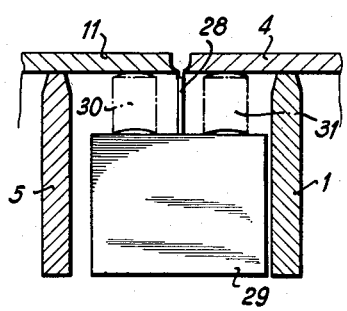
Figure 4:
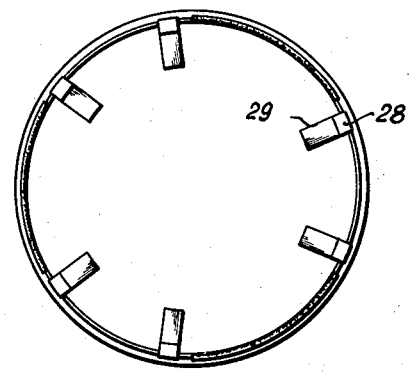
Figure 5:
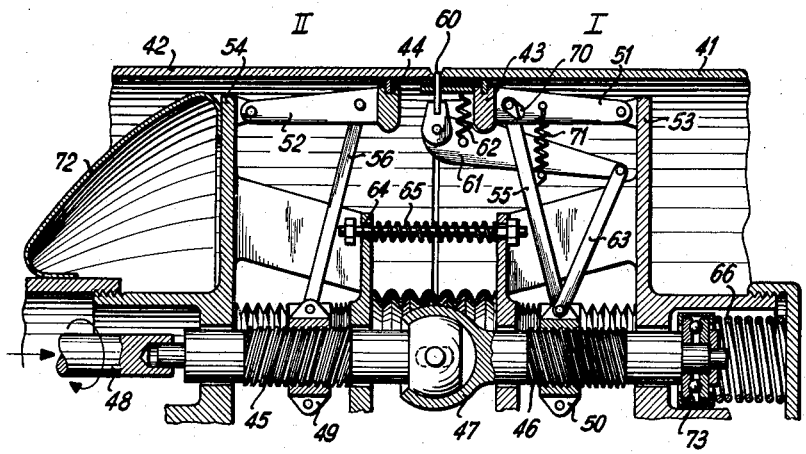
Figure 6:
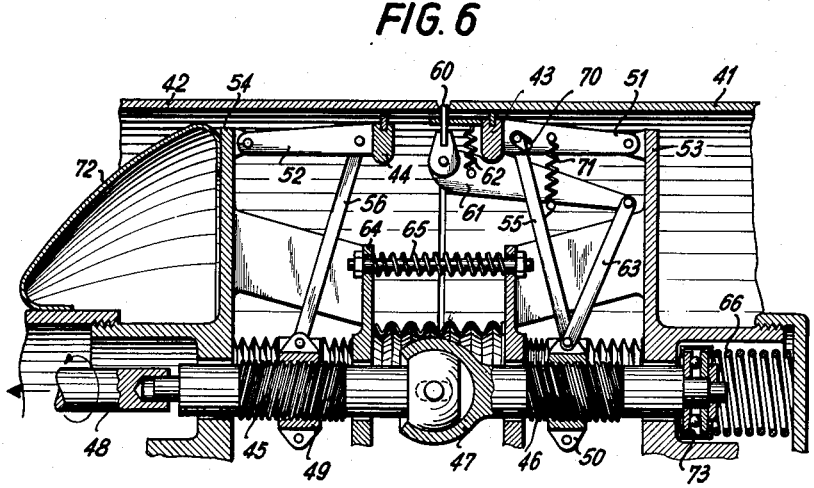

In the drawings:
FIG. 1 and FIG. 2 each show a side view of an embodiment in diagrammatic form, respectively before and after alignment;
FIG. 3 shows the essential aligning members by themselves;
FIG. 4 goes on to show a diagram of a seam with back weld half completed, using three arcs;

FIG. 5 shows another embodiment, in firmly clamped position;
FIG. 6 shows the same embodiment at the time of commencing to withdraw the spacers from the partly welded seam;
FIG. 7 shows the same embodiment at a somewhat later stage still, namely after complete withdrawal of the spacers and loosening of both clamping systems;
FIG. 8, finally, to a somewhat larger scale, shows a minor modification of some of the members in this second embodiment according to FIGS. 5 to 7.

In the first embodiment according to FIGS. 1 to 3, the individual sectors 1 of the right-hand clamping system I are being subjected to pressure through a linkage 2 by means of a hydraulic press 3 until they bear on the inner surface of the end of the length of pipe 4 already laid. The sectors 5 of the generally similar clamping system II are similarly thrust outward by levers 6 and a hydraulic press 7. A plurality of compression springs 8 evenly distributed on the circumference meanwhile hold the sectors of system I against the heads 9 of bolts 10 passing through the springs and movable relative to sectors 1, as may be seen at the top of FIG. 2. This has the effect that in relaxed condition of system II, its plane of action is parallel to that of system I. Now if the next length of pipe 11 is thrust on and system II subjected to pressure, its sectors will move outward until they are all in contact and bearing circularly on the pipe. As a rule, this will leave an uneven gap, widest on one side, as indicated at the top of FIG. 1. Since system II is rotatable on a ball articulation 12, the pipe to be welded in place can be rotated without releasing the radial tension of II and without particular exertion until the gap is even all the way around. This situation is illustrated in FIG. 2. If the press 7 is at the same time supplied with further pressure, then the axial component acting on sectors 5 will ultimately equal the full force of the press, and hence overcome the force of springs 8 and thrust pipe 11 tight against pipe 4, the peripheral gap being maintained by spacers 28. During these operations, not only are the two ends of pipe forced into circularity, but they are also aligned, and any edge offset will be uniformly distributed around the circumference. Since the center of rotation 13 of system II is in the plane of the seam, the butt edge of pipe 11 moves axially upon tilting, so that no additional edge offset can result. The final axial setting thus takes place automatically under high pressure, without any supplementary mechanism.

The sectors 1 and 5 slide in annular channels 14 and 15 positively attached to press mountings 16 and 17 by conical sheet-metal housings 18 and 19. In addition, a sleeve 20 fixed to press 7 slides in mounting 17. The reaction of press 7 is thus transmitted via members 20, 21, 22, 23, 24, 25, 18, 14 and 1 to pipe 4. Finally, a compression spring 26 is provided, which, after release of presses 3 and 7, restores their pistons and at the same time returns and holds system II in initial position (FIG. 1) against stop 27.

FIGS. 3 and 4 schematically show the arrangement of spacers for three-arc welding. The spacers consist of strips 28 of hardened spring steel, each replaceably mounted in a holder 29. This holder has two bolts 30 and 31 that can be extended against the respective pipe ends, thus forcing the holder inward and withdrawing the spacer 28 fixed thereto. These holders 29 are movably suspended from sectors of system I. They share the radial movements of the sectors when being extended and retracted, and can moreover be moved radially relative to the sectors.

After completing the weld over the arc lengths initially attacked, generally 50% of the circumferential seam (see FIG. 4), the spacers 28, more or less tightly wedged in owing to the shrinkage stresses due to welding, are withdrawn inward with a force of up to several tons by actuation of the two bolts 30 and 31, as shown in FIG. 3.

All of the operations thus far explained may be rendered automatic to a very large extent, for example by electrical control of the hydraulic system. Instead of the hydraulic action, a pneumatic, electromagnetic or purely mechanical actuation of the clamping sectors and spacers may be provided.

In order that a minimum number of sizes may suffice, the clamping sectors may be interchangeable. Then a few basic units need only be provided, their design otherwise varying only according to the number of arcs. For intermediate pipe sizes, then, the sectors are simply changed.

As described, the device according to the invention is intended for circular seams. With all the functions described, however, it may equally be used for elliptical deformation according to Patent No. 2,783,359. For this purpose, the lateral sectors of both systems need merely be surmounted by shoes of approximately elliptical shape, with transitions upward and downward. Since only the absolute change in gap, about +0.5 mm. on a side, is critical, deformations of the pipe ends are comparatively small on the large diameters for which this internal clamping device is intended, so that the attachment of the shoes and the adjustment of the holders presents no particular difficulty.

In FIGS. 5 to 8 also, pertaining to the second embodiment, suppose the right-hand pipe end 41 represents the length of pipe already laid, while the end 42 of the next length to be welded in place is shown at the left. As before, the right-hand clamping system as a whole is referred to as system I, and the left-hand one as system II.

The right-hand pipe end is clamped by means of sectors 43, engaging it from within. System II is similarly provided with sectors 44. The actuating force for the sectors is provided by a screw. This consists of the two spindles 45 and 46, coupled by a ball-and-socket joint 47 and turned from the left by means of a torsion bar 48. The latter is sufficiently longer than the length of pipe to be attached so that its left-hand end is accessible and can be cranked manually or turned over by means of a motor. Preferably, it may be in the form of an articulated shaft so that it will pass through an elbow. A lighter flexible shaft may be used if it is run at higher speed. Thus it may be driven from the left by a motor at higher speed, and connected to spindle 45 by a reduction gear attached to the housing of system II. Alternatively, the electric motor may be mounted on the said housing of system II, leaving only the electric power line to be fed through the left-hand pipe section 42 being added, together with a rope or the like by which the centering device can be pulled towards the left to the open end of the pipe when loosened after the welding operation has been completed.

The ball-and-socket joint 47 must be heavy enough to transmit both the considerable torques and the considerable thrusts involved. Instead of such a ball-and-socket joint, of course, any other type of coupling may be used if suitable for joining two rotatable shafts at an angle and flexible enough for the aligning operation.

Spindles 45 and 46 are fitted with nuts 49 and 50 which travel in opposite directions as the shaft revolves. When tightened, they traveled towards each other, so that in the clamped position shown in FIG. 5, the two nuts 49 and 50 are in extreme inward position.

Sectors 43 and 44 are attached to the ends of levers 51 and 52, pivoted to the frames 53 and 54 of the two clamping systems. It will be seen in FIG. 5 that the previous rotation of the shaft 48—45—47—46 in the direction of the curved arrow has brought the two nuts 49 and 50 together into the extreme position shown, thereby extending levers 51 and 52 by means of connecting rods 55 and 56, and forcing sectors 43 and 44 against the walls of the pipe from within, as FIG. 5 shows.

The spacers 60 are linked to the clamping system associated with the pipe section already laid, namely system I on the right. These spacers 60 are each attached to the end of a lever 61 supported on sector 43 under the tension of a spring 62, while its other arm is linked to nut 50 by another connecting rod 63. Evidently, the previous moment of the nut to the left propelled the spacers 60 radially outward.

Finally, in like manner as in the embodiment of FIGS. 1 to 3, bolts 64 and springs 65 are provided to keep the two clamping systems about parallel to each other initially.

The procedure of clamping and centering is first to insert the right-hand system I in the open end of the stationary length of pipe 41 already laid. The length of pipe to be added is still some little distance off. Its clamping system II is therefore as yet clear. However, the articulated shaft 48 passes through pipe 42 and can therefore be turned at its outermost (left-hand) end, for example by means of a hand crank. By this rotation, the two nuts 49 and 50 are moved towards each other. During this preliminary tightening (that is, before system I has been locked into pipe end 41), the entire centering device is roughly aligned by means of the spacers 60, simultaneously traveling radially outward at the edge of pipe end 41, placing the centering device approximately in axial direction.

The device is so designed that sectors 44 lag behind sectors 43, their circumscribed circle being 5 to 10 mm. smaller in diameter, and do not reach their final span by the time the right-hand system I has been clamped fairly tight.

Now the left-hand pipe end 42 is advanced until it touches. This will happen at the spacer 60 located near the narrowest point along the gap, since as a rule the two pipes will not yet be in exact alignment; instead, their centerlines will make a small angle (perhaps a few minutes of arc). Then the screw will be rotated further. Since the right-hand clamping system is already tight, so that nut 50 cannot travel farther towards the seam, but is more or less locked, provision is made to enable the screw to turn nevertheless. For this purpose, the right-hand spindle 46 is rendered axially displaceable. When nut 50 remains at rest, spindle 46, under continued rotation, will screw out towards the right against the force of a spring 66. Since the left-hand spindle 45 is positively coupled with the right-hand spindle 46 by joint 47, so as to transmit both torque and thrust, the left-hand spindle 45 will also move axially to the right to the same extent as spindle 46 until nut 49 has reached its extreme position and sectors 44 have been clamped tight.

Until this time of fixation of the left-hand system II, the two systems (taking the planes of sectors 43, 44 as the criterion) have been parallel to each other, being held so by bolts 64 and springs 65. Now that both clamping systems are locked, the operation of aligning the two pipes at the butt edges, which may stand at a small angle to each other, begins. The spindles are rotated further. Since the connecting rods 55 and 56 can yield no farther in radial direction, the forces acting on nuts 49 and 50 will pull the two systems I and II towards each other bodily. It was assumed that contact occurred with the spacer 60 located near the narrowest point of the gap; if it did not, it will occur now. The powerful axial force now pulling the two pipe ends together will therefore cause the gap to narrow in the wider places until all the spacers are pinched tight, thus stopping the movement of axial approach. This at the same time effects an alingment of the two pipe ends, by a corresponding swing of the length of pipe being added.

Taking, as an example, the addition of a section perhaps 12 meters in length, with a diameter of said 500 to 1000 mm., naturally the centering device will not be able to hoist this heavy section by its near end. Rather, the far end will be supported by a crane, so that the centering device need only effect a slight residual adjustment within the range of give in the cables. In the horizontal plane, however, the force developed by the centering device will be quite sufficient to produce the necessary swing for axial alignment. This is how the locked condition illustrated in FIG. 5 was brought about.

In this locked, centered and aligned position of the two pipe ends as shown in FIG. 5, the back weld is made, fixing the pipes so that the centering device becomes dispensable. The remaining layers of the weld can be completed after unclamping. The spacers 60, therefore, must now be withdrawn from the gap, which requires considerable force because of shrinkage stresses. This operation is illustrated in FIG. 6; for the purpose, shaft 48 is rotated in the opposite direction, as indicated by the curved arrow. At first, nut 50 cannot yet move to the right because connecting rod 63 is locked by the tightly pinched spacer 60. For the time being, therefore, turning of spindle 46 merely displaces it to the left into the position shown, with thrust bearing 73 in contact with the frame 53. In the left-hand system II, however, rotation of spindle 45 propels nut 49 to the left and thereby retracts sectors 44, so that the left-hand clamping system II is clear.

Upon further rotation, spindle 46 is unable to travel farther to the left, having reached its extreme position, as the thrust bearing 73 at the right shows. Now further rotation of spindle 46 will cause nut 50 to travel to the right, pulling spacer 60 out of the gap by means of connecting rod 63 and lever 61. The fulcrum of lever 61 is sector 43, which is pressed radially outward against the inside wall of the pipe. Since connecting rods 55 and 63 are both linked to nut 50, connecting rod 55 is linked to the levers 51 supporting the sectors 43 by a pin in a slot 70 of the lever. By virtue of this slot, spacers 60 are pulled first, and only then, when the spacer lever 61 has been relieved, will the tension spring 71 draw up the sector lever 51. Slot 70 is shown diagonal in the drawings. Alternatively, however, it may be substantially vertical or horizontal. Finally, mention should be made of a sheet-metal guard 72, serving to facilitate placement of the loose length of pipe 42.

In view of the magnitude of the forces required to pull the spacers out of the partially welded gap, the first-class lever 61 requires a suitable mechanical advantage, the ratio of the lever arms being about 3:1 or 5:1 or even more.

When the spacer 60 has been retracted in this way, so that it no longer acts on sector 43 through the fulcrum of its lever 61, then further travel of nut 50 to the right will ultimately disengage spacer levers 61 and sectors 43 completely, thus releasing the clamping device.

This final position of complete disengagement is illustrated in FIG. 7. In this position, the centering device can be pulled out to the left through the added length of pipe 42 by shaft 48, to be locked in again at the open end as previously described.

FIG. 8 shows slight modifications of a few parts. The guiding consideration was that of mutual alignment of the clamping systems I and II before beginning to align the pipes. With reference to FIG. 5, it was previously explained that bolts 64 and springs 65 initially kept the two systems parallel with each other until locked. That is, the two planes formed by sectors 43 and 44 respectively are parallel. Now of course it may happen that system I is not inserted quite perpendicular to the centerline in pipe end 41, so that the plane of system II will also be somewhat oblique. Small errors of this kind will not matter. Incidentally, a sufficiently accurate insertion of system I perpendicular to the centerline of pipe 41 can be ensured by providing this system I with a guide arm extending to the right (perhaps 0.5 or 1.0 m. in length) and provided with a roller cooperating with the wall of the pipe, to avoid major obliquities. The embodiment of FIG. 8 achieves this object by different means. Whereas in FIGS. 5 to 7 the left-hand system II was aligned in relation to the right-hand system I, it is here aligned indirectly with respect to the plane of the butt edge of the right-hand pipe 41. For this purpose, the spacer 60 is pivoted in such manner that even when the right-hand system I is inserted in somewhat oblique position, all spacers 60 will make contact with the edge of pipe 41. Pins 80, pushed to the right by springs 81, thus have the effect of setting the plane of the left-hand clamping system II parallel to the plane determined by the spacers 60 and hence parallel to the plane of the butt edge, regardless of any obliquity of the plane of the sectors 43 of the right-hand system I.

The same FIG. 8 has been used to illustrate another possible variant, namely the withdrawal of spacers 60, individually or in groups, by hydraulic means. Instead of the connecting rod 63 of FIGS. 5 to 7, actuated by nut 50, a hydraulic cylinder 82 and piston 83 are provided to act on lever 61. Nut 50 (here not shown) in this case serves only to drive sectors 43.

This second embodiment—with or without the slight modifications of FIG. 8—also differs significantly from that of FIGS. 1 to 3 in that the sectors 43 and 44 are not guided by channels but by means of linkage.

What we claim is:

1. A device for axially aligning the juxtaposed ends of two contiguous pipe sections, comprising first and second substantially rigid support members each positionable in a respective one of said ends, articulation means interconnecting said support members for relative swinging motion at substantially a single location intermediate said members about a pivotal axis transverse to the common axis of the ends of said pipe sections in the aligned condition thereof, spring means interconnecting said support members and biasing them normally into axial alignment, first clamping means mounted on said first support member and substantially radially displaceable thereon for engagement with the interior of an associated pipe section, second clamping means mounted on said second support member and substantially radially displaceable thereon for engagement with the interior of the other pipe section, and drive means for displacing both said clamping means.

2. A device for axially aligning the juxtaposed ends of two contiguous pipe sections, comprising first and second substantially rigid support members each positionable in a respective one of said ends and substantially coaxial therewith, articulation means interconnecting said support members for relative swinging motion at substantially a single location intermediate said members and at the region of juxtaposition of said ends about a pivotal axis transverse to the common axis of the ends of said pipe sections in the aligned condition thereof, spring means interconnecting said support members and biasing them normally into axial alignment, first clamping means mounted on said first support member and substantially radially displaceable thereon for engagement with the interior of an associated pipe section, second clamping means mounted on said second support member and substantially radially displaceable thereon for engagement with the interior of the other pipe section, means for displacing one of said clamping means in the direction of the other of said clamping means against the force of said spring means to draw said section together and drive means for operating said clamping means.

3. A device for axially aligning the juxtaposed ends of two contiguous pipe sections, comprising first and second substantially rigid support members each positionable in a respective one of said ends and substantially coaxial therewith, articulation means interconnecting said support members for relative swinging motion at substantially a single location intermediate said members and at the region of juxtaposition of said ends about a pivotal axis transverse to the common axis of the ends of said pipe sections in the aligned condition thereof, spring means interconnecting said support members and biasing them normally into axial alignment, first clamping means comprising a plurality of angularly spaced first clamping sectors radially displaceably mounted on said first support member, second clamping means comprising a plurality of angularly spaced second clamping sectors radially displaceably mounted on said second support member, first and second axially displaceable actuating elements operatively coupled to said first and second sectors and mounted on said first and second members, respectively, for urging them outwardly against the interior surfaces of the respective pipe ends, means for displacing one of said clamping means in the direction of the other of said clamping means against the force of said spring means to draw said section together and drive means for displacing said actuating elements.

4. A device for axially aligning the juxtaposed ends of two contiguous pipe sections, comprising first and second substantially rigid support members each positionable in a respective one of said ends and substantially coaxial therewith, articulation means interconnecting said support members for relative swinging motion at substantially a single location intermediate said members and at the region of juxtaposition of said ends about a pivotal axis transverse to the common axis of the ends of said pipe sections in the aligned condition thereof, spring means interconnecting said support members and biasing them normally into axial alignment, first clamping means comprising a plurality of angularly spaced first clamping sectors radially displaceably mounted on said first support member, second clamping means comprising a plurality of angularly spaced second clamping sectors radially displaceably mounted on said second support member, first and second axially displaceable actuating elements operatively coupled to said first and second sectors and slidably mounted on said first and second members, respectively, for urging them outwardly against the interior surfaces of the respective pipe ends, drive means for displacing said actuating elements, thereby clamping said sectors against said pipe sections, and resilient means bearing axially upon said elements and effective to disengage said sectors from said sections upon decoupling of said drive means.

5. A device for axially aligning the juxtaposed ends of two contiguous pipe sections, comprising first and second substantially rigid support members each positionable in a respective one of said ends and substantially coaxial therewith, universal-joint means interconnecting said support members for relative swinging motion at substantially a single location intermediate said members and at the region of juxtaposition of said ends about at least one pivotal axis transverse to the common axis of the ends of said pipe sections in the aligned condition thereof, spring means interconnecting said support members and biasing them normally into axial alignment, first clamping means comprising a plurality of angularly spaced first clamping sectors radially displaceably mounted on said first support member, second clamping means comprising a plurality of angularly spaced second clamping sectors radially displaceably mounted on said second support member, first and second axially displaceable actuating elements operatively coupled to said first and second sectors and mounted on said first and second members, respectively, for urging them outwardly against the interior surfaces of the respective pipe ends, and means including said spring means for urging said first and second sectors into mutually parallel axially spaced transverse planes.

6. A device for axially aligning the juxtaposed ends of two contiguous pipe sections, comprising first and second substantially rigid support members each positionable in a respective one of said ends and substantially coaxial therewith, articulation means interconnecting said support members for relative swinging motion at substantially a single location intermediate said members and at the region of juxtaposition of said ends about a pivotal axis transverse to the common axis of the ends of said pipe sections in the aligned condition thereof, spring means interconnecting said support members and biasing them normally into axial alignment, first clamping means comprising a plurality of angularly spaced first clamping sectors radially displaceably mounted on said first support member, second clamping means comprising a plurality of angularly spaced second clamping sectors radially displaceably mounted on said second support member, first and second axially displaceable actuating elements, link means operatively coupling said elements to said first and second sectors, said elements being mounted on said first and second members, respectively, for urging said sectors outwardly against the interior surfaces of the respective pipe ends, means for displacing one of said clamping means in the direction of the other of said clamping means against the force of said spring means to draw said section together and drive means for displacing said actuating elements.

7. A device according to claim 6 wherein said support members include a pair of oppositely threaded spindles, said articulation means comprising a universal joint interconnecting said spindles, said actuating elements including nuts threadedly engaging said spindles, respectively, and said drive means includes means for reversibly rotating said spindles.

8. A device for axially aligning the juxtaposed ends of two contiguous pipe sections, comprising first and second substantially rigid support members each positionable in a respective one of said ends and substantially coaxial therewith, universal-joint means interconnecting said support members for relative swinging motion at substantially a single location intermediate said members and at the region of juxtaposition of said ends about at least one pivotal axis transverse to the common axis of the ends of said pipe sections in the aligned condition thereof, spring means interconnecting said support members and biasing them normally into axial alignment, first clamping means comprising a plurality of angularly spaced first clamping sectors radially displaceably mounted on said first support member, second clamping means comprising a plurality of angularly spaced second clamping sectors radially displaceably mounted on said second support member, first and second axially displaceable actuating elements operatively coupled to said first and second sectors and mounted on said first and second members, respectively, for urging them outwardly against the interior surfaces of the respective pipe ends, means for displacing one of said clamping means in the direction of the other of said clamping means against the force of said spring means to draw said section together and hydraulic drive means for displacing said actuating elements.

9. A device for axially aligning the juxtaposed ends of two contiguous pipe sections, comprising first and second substantially rigid support members each positionable in a respective one of said ends and substantially coaxial therewith, articulation means interconnecting said support members for relative swinging motion at substantially a single location intermediate said members and at the region of juxtaposition of said ends about a pivotal axis transverse to the common axis of the ends of said pipe sections in the aligned condition thereof, spring means interconnecting said support members and biasing them normally into axial alignment, first clamping means comprising a plurality of angularly spaced first clamping sectors radially displaceably mounted on said first support member, second clamping means comprising a plurality of angularly spaced second clamping sectors radially displaceably mounted on said second support member, first and second axially displaceable actuating elements operatively coupled to said first and second sectors and mounted on said first and second members, respectively, for urging them outwardly against the interior surfaces of the respective pipe ends, a plurality of angularly spaced radially displaceable spacer members mounted on at least one of said support members, mechanism for inserting said spacer members between said pipe sections and withdrawing them from the gap thus established, means for displacing one of said clamping means in the direction of the other of said clamping means against the force of said spring means to draw said section together and drive means for displacing said actuating elements.

10. A device for axially aligning the juxtaposed ends of two contiguous pipe sections, comprising first and second substantially rigid support members each positionable in a respective one of said ends and substantially coaxial therewith, articulation means interconnecting said support members for relative swinging motion at substantially a single location intermediate said members and at the region of juxtaposition of said ends about a pivotal axis transverse to the common axis of the ends of said pipe sections in the aligned condition thereof, spring means interconnecting said support members and biasing them normally into axial alignment, a plurality of angularly spaced first clamping sectors radially displaceably mounted on said first support member, a plurality of angularly spaced second clamping sectors radially displaceably mounted on said second support member, first and second axially displaceable actuating elements operatively coupled to said first and second sectors and mounted on said first and second members, respectively, for urging them outwardly against the interior surfaces of the respective pipe ends, a plurality of angularly spaced radially displaceable spacer members mounted on at least one of said support members, mechanism including a respective actuating element for inserting said spacer members between said pipe sections and withdrawing them from the gap thus established, and drive means for displacing both said clamping means.

References Cited in the file of this patent

UNITED STATES PATENTS

| | | |
|---|---|---|
| 1,181,894 | Arni | May 9, 1916 |
| 2,177,916 | Thomas et al. | Oct. 31, 1939 |
| 2,413,102 | Forbes | Dec. 24, 1946 |
| 2,461,517 | Carnevale | Feb. 15, 1949 |
| 2,525,680 | Ingemarson | Oct. 10, 1950 |
| 2,594,000 | Elliott | Apr. 22, 1952 |
| 2,615,413 | Adams et al. | Oct. 28, 1952 |
| 2,754,787 | Reed | July 17, 1956 |
| 2,804,836 | Tiedemann | Sept. 3, 1957 |
| 2,830,551 | Miller | Apr. 15, 1958 |

FOREIGN PATENTS

| | | |
|---|---|---|
| 790,948 | Great Britain | Feb. 5, 1958 |

OTHER REFERENCES

Mueller: abstract of application S.N. 134,286, published June 30, 1953, 671 O.G. 1498, 29–494.